(12) United States Patent
Rostagni et al.

(10) Patent No.: US 10,180,802 B2
(45) Date of Patent: Jan. 15, 2019

(54) COLLISION DETECTION AT MULTI-NODE STORAGE SITES

(71) Applicant: INTERNATIONAL BUSINESS MACHINES CORPORATION, Armonk, NY (US)

(72) Inventors: Florent C. Rostagni, Southampton (GB); Andrea Sipka, Chandler's Ford (GB); John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/598,362

(22) Filed: May 18, 2017

(65) Prior Publication Data

US 2018/0335962 A1 Nov. 22, 2018

(51) Int. Cl.
*G06F 12/14* (2006.01)
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
CPC ............................... G06F 3/0619; G06F 3/067
USPC ......................................................... 711/162
See application file for complete search history.

(56) References Cited

U.S. PATENT DOCUMENTS

| | | | |
|---|---|---|---|
| 7,103,586 B2 | 9/2006 | Holenstein et al. | |
| 7,177,866 B2 | 2/2007 | Holenstein et al. | |
| 7,237,078 B2 | 6/2007 | Hiraiwa et al. | |
| 7,293,050 B2 | 11/2007 | Arakawa et al. | |
| 7,340,743 B1 | 3/2008 | Anural et al. | |
| 8,346,719 B2 | 1/2013 | Sudhakar | |
| 8,868,857 B2 | 10/2014 | Wilkinson | |
| 8,868,874 B2 | 10/2014 | Wilkinson | |
| 8,874,680 B1 | 10/2014 | Das | |
| 9,032,160 B1 | 5/2015 | Natanzon et al. | |
| 9,229,827 B2 | 1/2016 | Burr et al. | |

(Continued)

FOREIGN PATENT DOCUMENTS

WO      2015183301 A1     12/2015

OTHER PUBLICATIONS

IBM: List of IBM Patents or Patent Applications Treated as Related (Appendix P), Feb. 5, 2018, pp. 1-2.

(Continued)

*Primary Examiner* — Jae U Yu
(74) *Attorney, Agent, or Firm* — Kristofer L. Haggerty

(57) ABSTRACT

Storage sites are allocated pairs of nodes in which one node of the pair acts as an owner node while the other a backup node. When a local owner node receives a colliding write, the local owner node obtains a lock on the modified database and transfers both the write data and metadata to a remote owner node. The remote owner node returns a write complete message and the local site owner unlocks the modified database. When a local backup node receives a colliding write, the local backup node requests a lock from the local owner node and sends the write data to the remote owner node while the local owner node sends the write metadata to the remote owner node. The remote owner node then returns a write complete message to the local backup node which then requests the modified database be unlocked by the local owner node.

20 Claims, 9 Drawing Sheets

(56) References Cited

U.S. PATENT DOCUMENTS

| | | |
|---|---|---|
| 9,244,997 B1 | 1/2016 | Natanzon et al. |
| 9,459,804 B1 | 10/2016 | Natanzon et al. |
| 9,575,857 B1 | 2/2017 | Natanzon |
| 2004/0260726 A1* | 12/2004 | Hrle .................. G06F 11/1466 |
| 2007/0050573 A1 | 3/2007 | Arakawa et al. |
| 2007/0226277 A1 | 9/2007 | Holenstein et al. |
| 2013/0198477 A1 | 8/2013 | Wilkinson |
| 2013/0315258 A1 | 11/2013 | Narvaez et al. |
| 2015/0067387 A1 | 3/2015 | Liao et al. |
| 2015/0370700 A1 | 12/2015 | Sabol et al. |
| 2016/0274796 A1 | 9/2016 | Braddy |
| 2017/0039099 A1 | 2/2017 | Ottavio |
| 2017/0091044 A1 | 3/2017 | Beeken et al. |

OTHER PUBLICATIONS

Rostagni et al., U.S. Appl. No. 15/888,307, filed Feb. 5, 2008, titled "Collision Detection at Multi-Node Storage Sites," pp. 1-40.

EMC, "EMC VNX Replication Technologies: An Overview, Abstract: This white paper highlights the VNX replication technologies. It provides information on EMC, MirrorView, VNX Replicator, RecoverPoint, Replication Manager, Symmetrix, Remote Data Facility (SRDF), and VPLEX", Nov. 2015, pp. 1-34.

Mell et al., "The NIST Definition of Cloud Computing," National Institute of Standards and Technology, U.S. Department of Commerce, Special Publication 800-145, Sep. 2011, pp. 1-7.

IBM: List of IBM Patents or Patent Applications Treated as Related (Appendix P), Jan. 29, 2018, pp. 1-2.

Parno et al., "Distributed Detection of Node Replication Attacks in Sensor Networks," Proceedings of the 2005 IEEE Symposium on Security and Privacy (S&P'05), May 8-11, 2005, Oakland, CA, USA, Date Added to IEEE Xplore: May 23, 2005, pp. 1-15.

Rostagni et al., Pending U.S. Appl. No. 15/877,405, filed Jan. 23, 2018, titled "Handling Node Failure in Multi-Node Data Storage Systems," pp. 1-41.

Zaharia et al., "Discretized Streams: An Efficient and Fualt-Tolerant Model for Steam Processing on Large Custers," 4th USENIX Workshop on Hot Topics in Cloud Computing, HotCloud '12, Jun. 12-13, 2012, Boston, MA, pp. 1-6.

\* cited by examiner

COLLISION DETECTION AT MULTI-NODE STORAGE SITES

TECHNICAL FIELD

The present invention relates to replicating data in a data storage system, and more particularly to preventing inconsistent backups when each storage site has multiple nodes.

BACKGROUND

In data storage systems, it is often useful to have stored data replicated in multiple locations so that the data is backed up and available locally in each of the locations. Each location will have a local data storage device, which can satisfy requests to read data on its own, i.e. without needing to query other data storage devices of the data storage system. However, requests to write data need to be distributed to each location, so that they can be applied in a consistent fashion. In particular, if multiple write requests are made to a particular region of storage, such as a block, sector or page of data in the storage, the writes must be applied in the same order by each local data storage device, otherwise the data stored in each local data storage device will be inconsistent. When write requests are received that could potentially not be applied in the same order on different local data storage devices, this is known as a "write collision".

A known solution to write collisions is to use one location to process write requests made to any of the locations, and distribute the result of that processing to the other locations, so that the data in each location is consistent. However, this means that for any location other than the location that processes the write requests, the time taken to complete a write request will be at least two times the round-trip-time between the locations.

SUMMARY

Embodiments of the present invention disclose a method, computer program product, and computer system for resolving write collisions at multi-node storage sites. Storage sites are allocated pairs of nodes in which one node of the pair acts as an owner node while the other a backup node. When a local owner node receives a colliding write, the local owner node obtains a lock on the modified database and transfers both the write data and metadata to a remote owner node. The remote owner node returns a write complete message and the local site owner unlocks the modified database. When a local backup node receives a colliding write, the local backup node requests a lock from the local owner node and sends the write data to the remote owner node while the local owner node sends the write metadata to the remote owner node. The remote owner node then returns a write complete message to the local backup node which then requests the modified database be unlocked by the local owner node.

DETAILED DESCRIPTION

Figure 1:
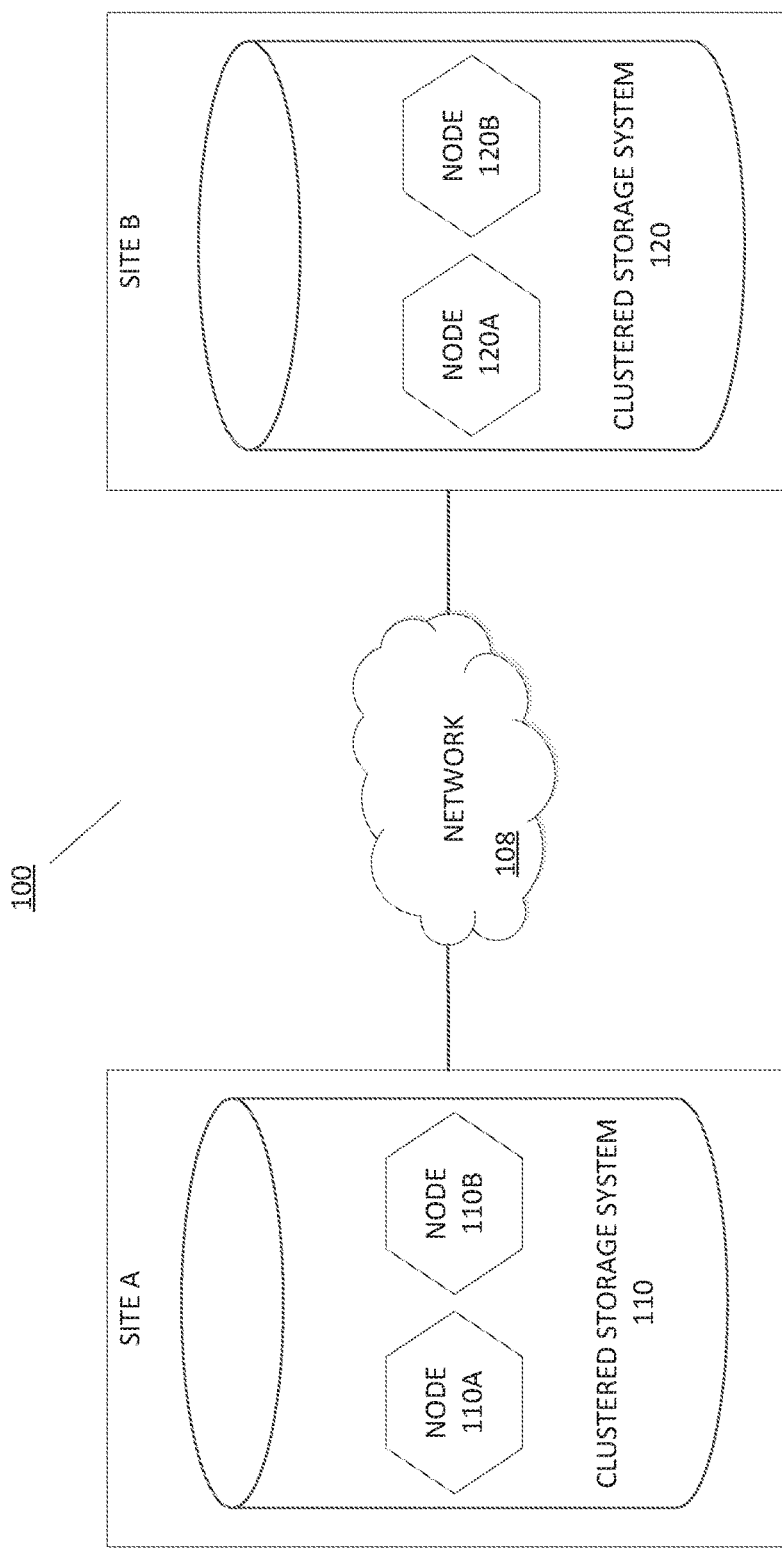
FIG. 1 is a schematic diagram of a multi-node collision reconciliation system 100, in accordance with an embodiment of the invention.

FIG. 1 illustrates the multi-node collision reconciliation system 100 of FIG. 1, in accordance with an embodiment of the invention.

In the example embodiment, network 108 may be the Internet, representing a worldwide collection of networks and gateways to support communications between devices connected to the Internet. Network 108 may include, for example, wired, wireless or fiber optic connections. In other embodiments, network 108 may be implemented as an intranet, a local area network (LAN), or a wide area network (WAN). In general, network 108 can be any combination of connections and protocols that will support communications between Site A and Site B.

Site A of FIG. 1 comprises clustered storage system 110 which contains volumes of data. Clustered storage system 110 includes nodes 110A and 110B which process input and output to the volumes of data contained in clustered storage system 110. Similarly, Site B of FIG. 1 comprises clustered storage system 120 which contains volumes of data. Clustered storage system 120 includes nodes 120A and 120B which process input and output to the volumes of data contained in clustered storage system 120. Nodes of site A are in communication with nodes of site B via network 108 such that data stored on clustered storage system 110 is replicated to clustered storage system 120 and vice versa. Each of nodes 110A and 110B are capable of processing input and output (IO), such as a read or a write, for volumes on site A while nodes 120A and 120B are capable of processing IO for volumes on site B. Each node of a site can act as a backup for each other's state, including replicating metadata and caching host writes that are not yet committed to physical storage; thus providing a highly available state that is effectively non-volatile.

For each IO received by sites A or B, the node of the site which receives the IO is designated as the processing node while the other node is designated as the partner node. For example, if an IO submitted to clustered storage system 110 is received by node 110A, then node 110A is designated as the processing node of site A while node 110B is designated as the partner node of site A. Additionally, for each volume, one node of each site is designated as an owner node while the other node of the site is designated as the backup node. The owner node maintains a canonical view of outstanding IO's suitable for ensuring collision detection for all ongoing writes for that volume in that site. Backup nodes have a less exact view suitable for error recovery should the owner node fail. For example, if node 110A is designated as the owner node of site A, then node 110B is designated as the backup node for site A, and vice versa.

At each of Sites A and B, processing nodes and partner nodes are mutually exclusive for any given IO; meaning a node cannot act as both simultaneously. Similarly, at each site, owner nodes and backup nodes are mutually exclusive for a volume; meaning a node cannot simultaneously act as both the owner node and the backup node. Depending on which node of a site receives the host IO, however, it is possible for either the owner node or the backup node to act as the processing node. For example, if node 110A of site A is designated as the owner node of volume A while receiving a host write to volume A, then node 110A is designated as the processing node and the owner node for the IO. Conversely, in the same example, if node 110B of site A is designated as the backup of site A while receiving a host write, then node 110B is designated as the processing node and the backup node for the IO. In the example embodiment, a pair of nodes (one processing node and one partner node) is responsible for many volumes on a data storage device, and each volume is handled by only one pair of nodes in each site. While the following implementations will exemplify processing of IO on a single volume, it should be noted that the invention applies equally to many volumes on one or more pairs of nodes in each site.

In the present invention, messages transmitted between clustered storage system 110 and clustered storage system 120 are considered in-order; meaning that two messages sent in a particular order from one device will be processed in the same order by another device. As such, the present embodiment does not concern itself with situations in which a previously sent message is overtaken by a more recently sent message, such as when a completion message is overtaken by a later-sent write message.

In the present invention, a site must be chosen to have its writes applied last in the event of a write collision. While choice of site makes no difference with regard to the performance of the invention, the embodiments exemplified herein assume site A has been designated as the site to have its writes applied last in the event of a collision. As used herein, the local site for a given IO is designated as the site at which the IO was submitted by a host device (not shown in FIG. 1) to a node, such as node 110A, while the remote site is any other site.

In the present invention, when a local write is initially received, both nodes at the site record the existence of the write before it is committed to local storage or transmitted to a remote system. The processing node retrieves metadata for the write, for example a volume index, start logical block addressing (LBA), and length in blocks. The processing node may then transmit the metadata to the partner node. Depending on the communications protocol being used for IOs, this may be performed without significantly increasing latency, for example by transmitting the metadata during the data transfer phase of the small computer system interface (SCSI) write protocol used in Fibre Channel and iSCSI-based storage environments.

Figure 2:
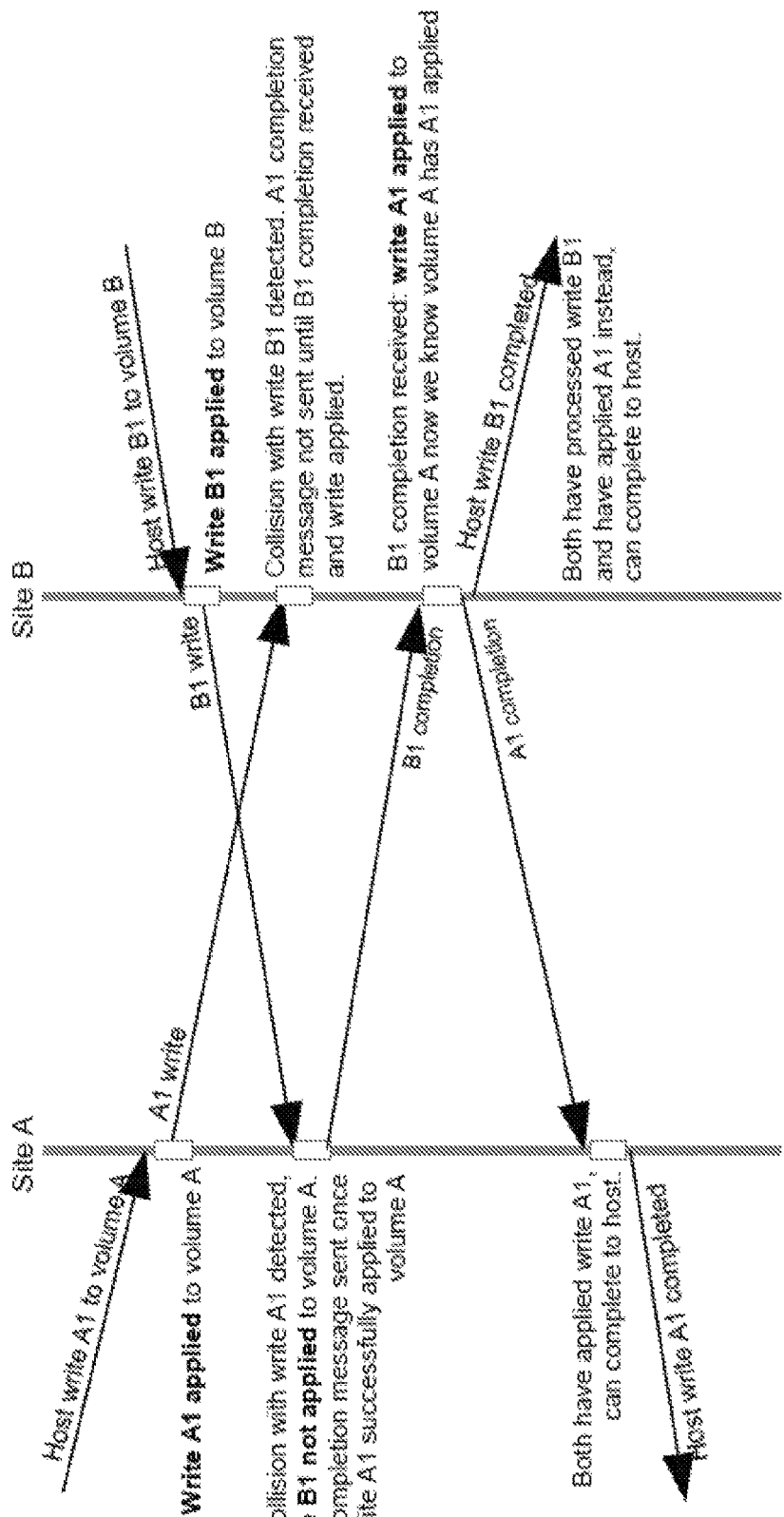
FIG. 2 is a schematic diagram illustrating a first example of the multi-node collision reconciliation system 100 of FIG. 1 in handling colliding write requests, in accordance with an embodiment of the invention.

FIG. 2 illustrates an overview example of the handling of colliding write requests between two storage sites. FIG. 2 is intended to illustrate the flow of data between storage sites and therefore omits reference to the multi-node functionality aspects of the present application, which will be described in greater detail in FIGS. 3-6 thereafter.

Host write A1 is received at clustered storage system 110 located at site A and Host write A1 is applied to volume A in clustered storage system 110. Clustered storage system 110 then sends Host write A1, now "A1 write", to clustered storage system 120 at site B. At this time, A1 write is applied locally, i.e. on site A, but not completed to the host system until receiving confirmation (A1 completion) that A1 write is successfully written on all remote sites, i.e. site B. Until receiving A1 completion, A1 write is considered outstanding by site A.

Prior to receiving A1 write from site A, clustered storage system 120 at site B receives Host write B1 to volume B and applies Host write B1 to volume B. Still prior to receiving A1 write from site A, clustered storage system 120 sends B1 write to clustered storage system 110 at site A. Subsequently, clustered storage system 120 receives A1 write. Having received a remote write, A1 write, while having an outstanding write, B1 write, site B determines that there is a write collision. Similarly, site A, having outstanding A1 write while receiving remote B1 write, also detects that a write collision has occurred. Note that because the data storage system described herein pertains only to systems which implement in-order messaging, a write collision is only detected by both sites A and B or neither sites A and B.

In the example illustrated by FIG. 2, both sites A and B have detected a write collision and site A has preliminarily applied Host write A1 (A1 write) while site B has preliminarily applied Host write B1 (B1 write). Because writes to clustered storage system 110 at site A are designated as the last writes applied in the event of a write collision with clustered storage system 120 at site B, site A disregards B1 write and applies Host write A1 before sending B1 completion to site B indicating that site A has applied Host write A1 instead of B1 write. Having received B1 completion from clustered storage system 110 at site A indicating that site A has applied A1 write instead of B1 write, clustered storage system 120 at site B may now apply A1 write knowing that the same write is being applied at both sites A and B. Clustered storage system 120 at site B then sends A1 completion to clustered storage device 110 at site A.

Again, it should be noted that FIG. 2 is only intended to illustrate an example communication between data storage sites A and B, and done so in a manner which assumes each of storage site A and B only have a single node receiving IO. FIGS. 3-6 of the present invention include the novel addition of handling write collisions when storage sites A and B, and more particularly clustered storage systems 110 and 120, each have multiple nodes (as illustrated by FIG. 1).

Figure 3:
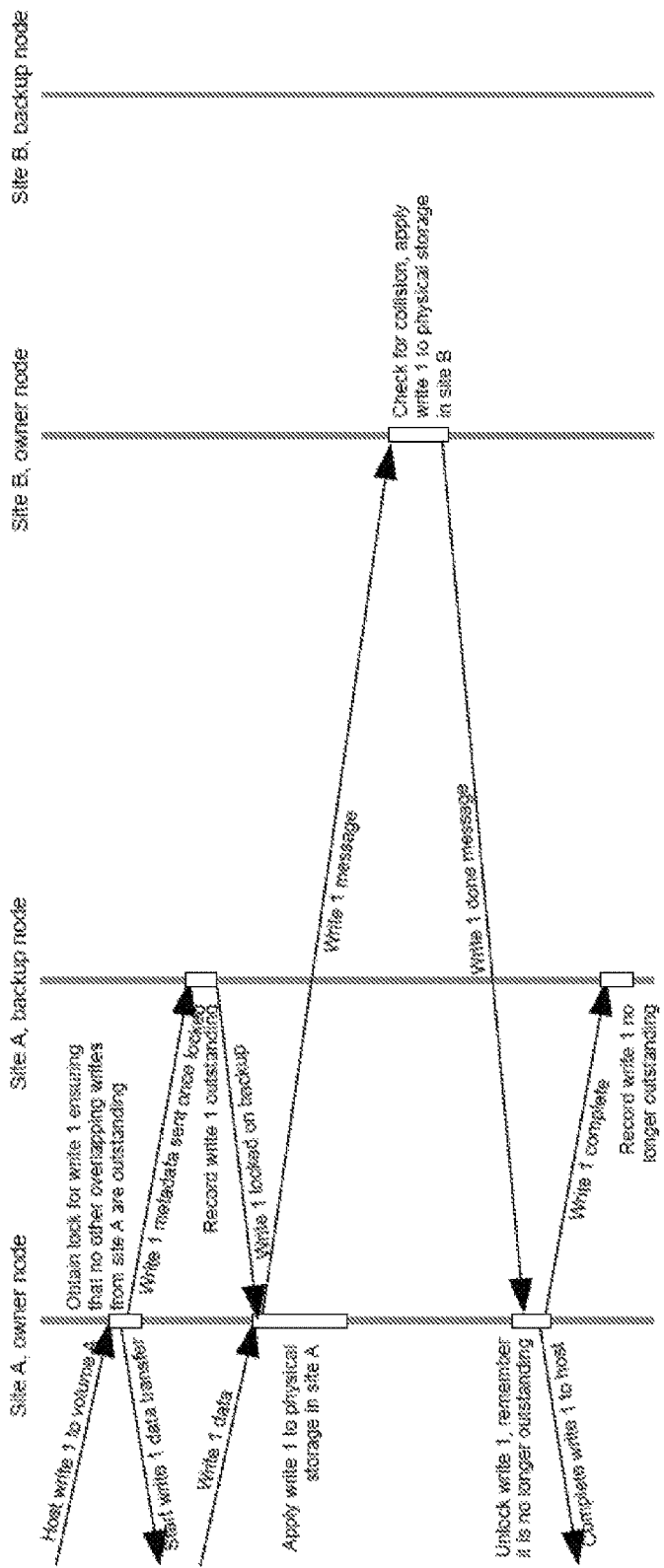
FIG. 3 is a schematic diagram illustrating the multi-node collision reconciliation 100 of FIG. 1 in handling colliding write requests when the owner node is the processing node, in accordance with an embodiment of the invention.

FIG. 3 illustrates an example of the handling of colliding write requests between two storage sites when the owner node is also the processing node, i.e. the owner node receives an IO request. Write operations in the SCSI protocol transfer the write data itself using a Data-Out phase, consisting of a data transfer request sent from the owner node to the host (Start write 1 data transfer) which then responds with the data itself (Write 1 data). Simultaneously, the owner node obtains a lock for write 1, ensuring that no other overlapping writes from site A are outstanding. After obtaining the lock, the owner node copies metadata to the backup node while the data transfer request is still outstanding. Because the data transfer request is generally hardware accelerated while metadata storage on the backup node is not, the data transfer request will typically complete before the metadata acknowledgment message is received by the owner node. This delay can, however, be reduced through careful coding of the metadata message handling on the backup node to accept and acknowledge the message as swiftly as possible.

Upon receiving Write 1 data from the host and a confirmation from the backup node that write 1 is both locked and recorded as outstanding, the owner node transmits Write 1 message to the owner node at site B. The owner node at site B checks for collisions by examining the set of writes outstanding from site B to site A for one with at least one LBA in common with the range of LBAs Write 1 addresses. If no collision is detected, the site B owner node applies Write 1 to physical storage at site B, otherwise the colliding portions of Write 1 are not written. After the completion of all the parts of Write 1 that the collision process has determined should be written, the site B owner node sends a Write 1 done message to the owner node at site A. The owner node at site A unlocks Write 1 and completes Write 1 to the host before notifying the site A backup node that Write 1 is complete. The backup node at site A then records Write 1 as no longer outstanding.

The owner node has the canonical view of outstanding IO's so it is responsible for performing LBA locking for each write. In FIG. 3, it should be noted that there are no outstanding writes for any LBA within write 1 and therefore the owner node is capable of obtaining an LBA lock immediately. The owner node records which writes are outstanding, including the start LBA and length, the logical unit number (LUN), and the data itself. This information is stored within an object tracking an individual outstanding write such that the owner node is capable of retransmitting received write messages. The backup node records what writes are outstanding in a similar way to the owner, however it does not have the data itself and is incapable of retransmitting messages received by the owner node. Rather, the backup node would have to reconstitute the data by re-reading the data on the local volume.

Figure 4:
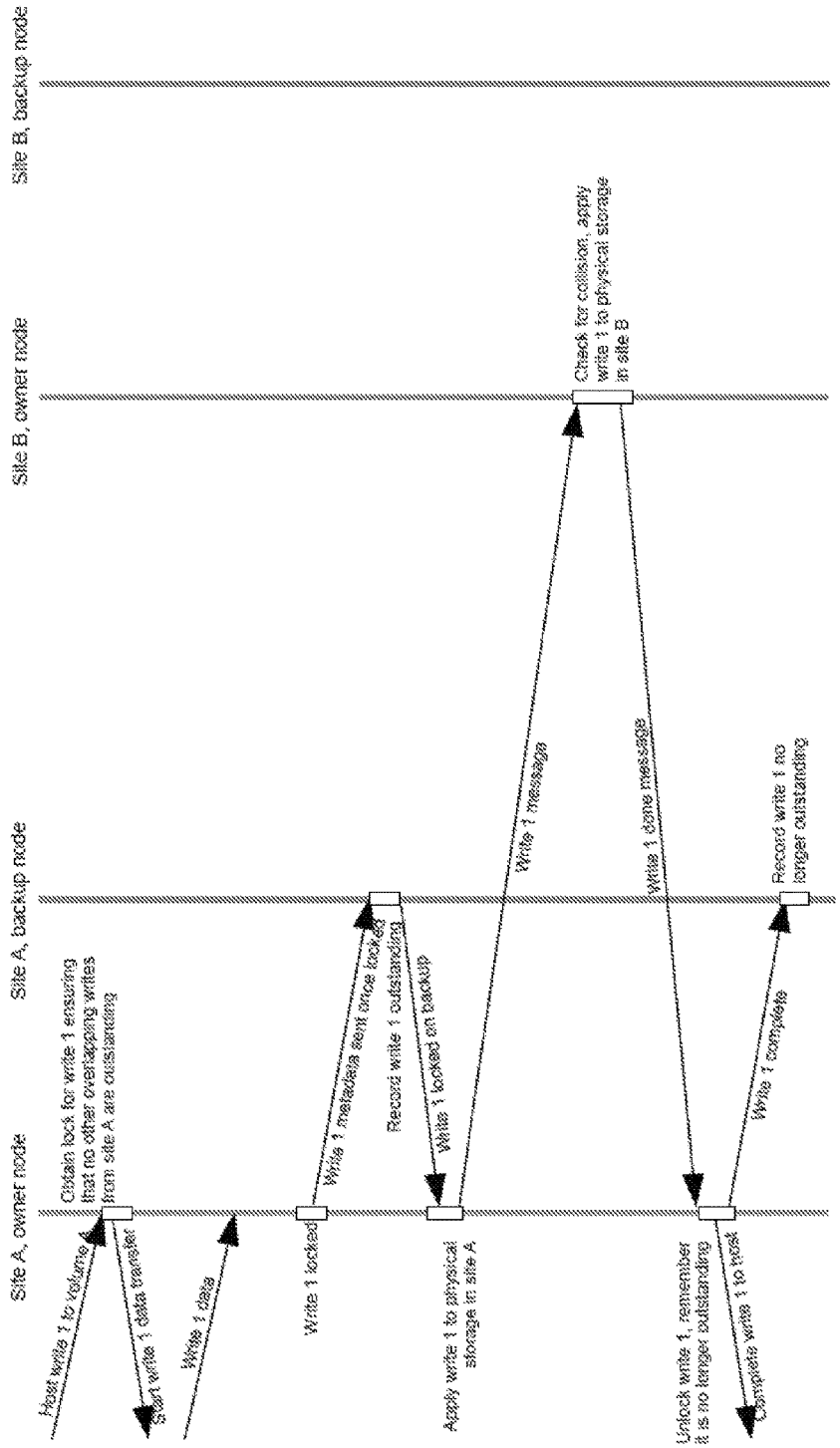
FIG. 4 is a schematic diagram illustrating the multi-node collision reconciliation system 100 of FIG. 1 in handling colliding write requests when the owner node is the processing node and obtaining a lock is delayed, in accordance with an embodiment of the invention.

FIG. 4 illustrates an embodiment similar to that of FIG. 3, in that the owner node is also the processing node. In FIG. 4, however, obtaining a lock for Write 1 is delayed by an earlier write to one or more shared LBA's. Because this is a rare occurrence, performance is not critical and the delay is acceptable. Other than the delay in obtaining the LBA lock, implementation is identical to that of FIG. 3.

Figure 5:
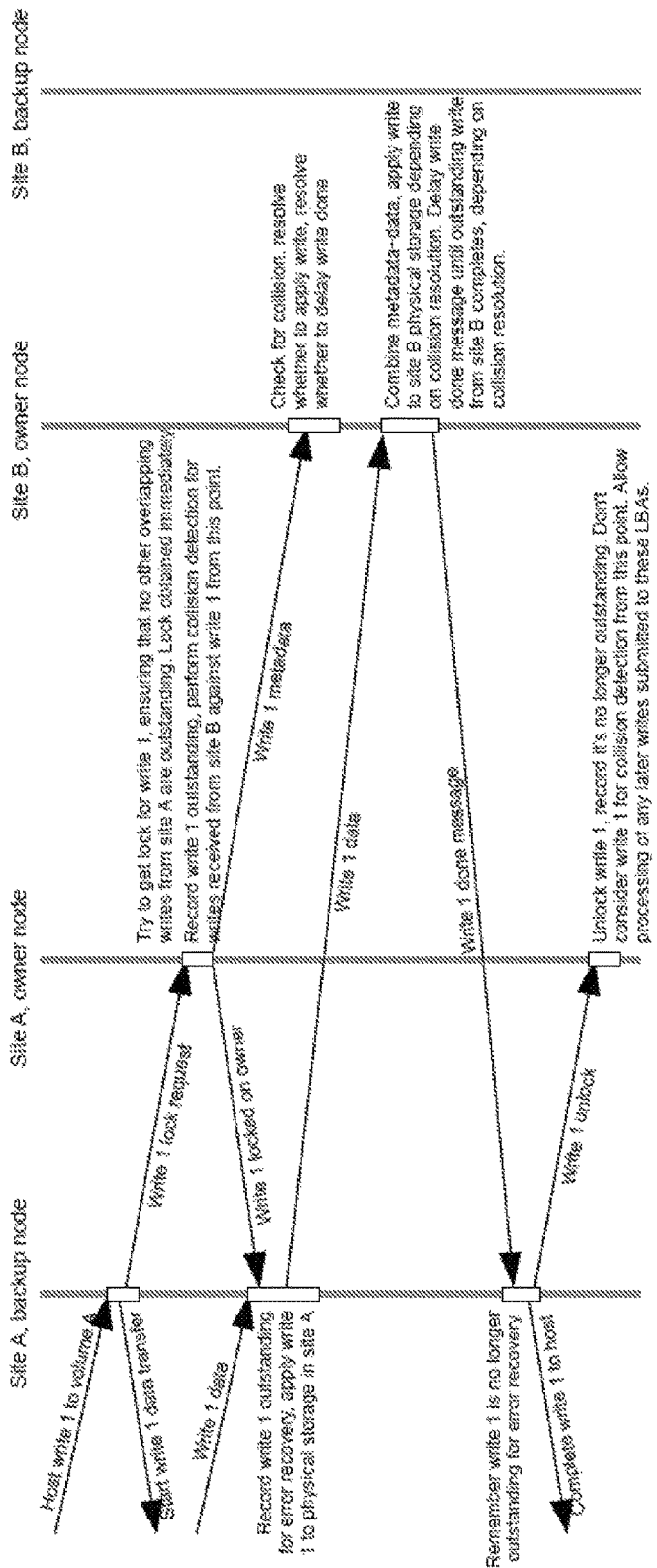
FIG. 5 is a schematic diagram illustrating the multi-node collision reconciliation system 100 of FIG. 1 in handling colliding write requests when the backup node is the processing node, in accordance with an embodiment of the invention.

FIG. 5 illustrates an example of the handling of colliding writes when the backup node acts as the processing node, i.e. the backup node receives the IO. Because the owner node is responsible for applying locks to LBA's, the backup node sends Write 1 lock request to the owner node of site A requesting that the appropriate LBA's are locked for the write. The owner node tries to get a lock for Write 1, ensuring that no other overlapping writes from site A are outstanding. When the owner node at site A obtains a lock for Write 1, the owner node records Write 1 as outstanding and begins performing collision detection for writes received from site B against Write 1. The owning node at site A then confirms that the LBA's are locked by sending Write 1 locked on owner to the backup node and, because the owner node is responsible for collision detection, also sends Write 1 metadata to the owner node at site B. The backup node, having received Write 1 data from the storage device, transmits Write 1 data to the owner node at site B.

Upon receiving Write 1 metadata, the owner node at site B performs collision detection in a similar manner to that described by FIG. 3 and determines whether to apply the write and/or delay the corresponding write done message in accordance with collision resolution described herein. Upon receiving both Write 1 data and Write 1 metadata, the owner node at site B can now apply Write 1 to site B physical storage and then send a delay Write 1 done message in accordance with the determined collision resolution. In the example embodiment, Write 1 data and Write 1 metadata are split such that the owner node only needs to handle Write 1 metadata (which is likely to be a few tens of bytes) while Write 1 data (which could be many kilobytes) is sent directly from the site A backup node to the site B owner node.

In cases in which the Write 1 data message arrives prior to the Write 1 metadata message, the site B owner node waits to write the data until it has received the Write 1 metadata message to ensure proper collision detection.

In an alternative embodiment of FIG. 5, Write 1 data (and Write 1 metadata) may be passed from the site A backup node to the site A owner node before being passed to the Site B owner node. Such an implementation may increase simplicity but may negatively impact performance by requiring that the owner node forward a significantly larger message. However, it may be possible to leverage such a system when implementing a 2-way cache where data is already copied between the owner and backup node.

Upon receiving Write 1 metadata, the owner node at site B checks for and resolves any collisions in a similar manner to that of FIG. 3. Then, depending on the appropriate collision resolution, combines the Write 1 data with the metadata before applying the write to site B physical storage and delaying the write done message, if necessary. In the example embodiment, the owner node at site B sends a single Write 1 done message to the site A processing node (the backup node in FIG. 5) in response to receiving the Write 1 metadata and Write 1 data messages either separately (the example embodiment of FIG. 5) or together (the alternative embodiment of FIG. 5). This allows Host write 1 to volume A to complete as soon as possible, which prompts the message Complete write 1 to host. In FIG. 5 where the site A backup node is the processing node (received the local host write), and because owner nodes maintains the locks on the LBA's, the site A backup node, acting as the processing node, must send the Write 1 unlock message to the site A owner node to unlock the LBA's upon receiving the Write 1 done message. Having received the Write 1 unlock message from the site A backup node, the site A owner node releases the locks on the LBA's and later writes to the LBA's are allowed to be processed in order.

In another alternative embodiment of FIG. 5, the site B owner node always sends the Write 1 done message to the site A owner node regardless of which node at site A is the processing node. The site A owner node then sends a write complete message to the site A backup node, similar to the final step of FIGS. 3 and 4. In this embodiment, the Write 1 done message would be delayed in reaching the site A processing node, which would increase latency of writes submitted to the backup node. However, it would slightly improve overall throughput if multiple writes were submitted at a site to the same region via the backup node, as each write would be considered outstanding (and holding the LBA lock) for less time.

In all embodiments, the backup node will remember what writes are outstanding, including start LBA and length, the LUN, and the data itself. This data will be stored within an object tracking an individual outstanding write. As such, if a backup node is called to retransmit a write message for a write received on the backup node, it may do so exactly. The owner node will remember what writes are outstanding in a similar way to the backup node. However, as it does not have the data itself, it would not be able to retransmit write message exactly. Rather, the owner node would have to reconstitute the data by re-reading the data on the local volume.

Figure 6:
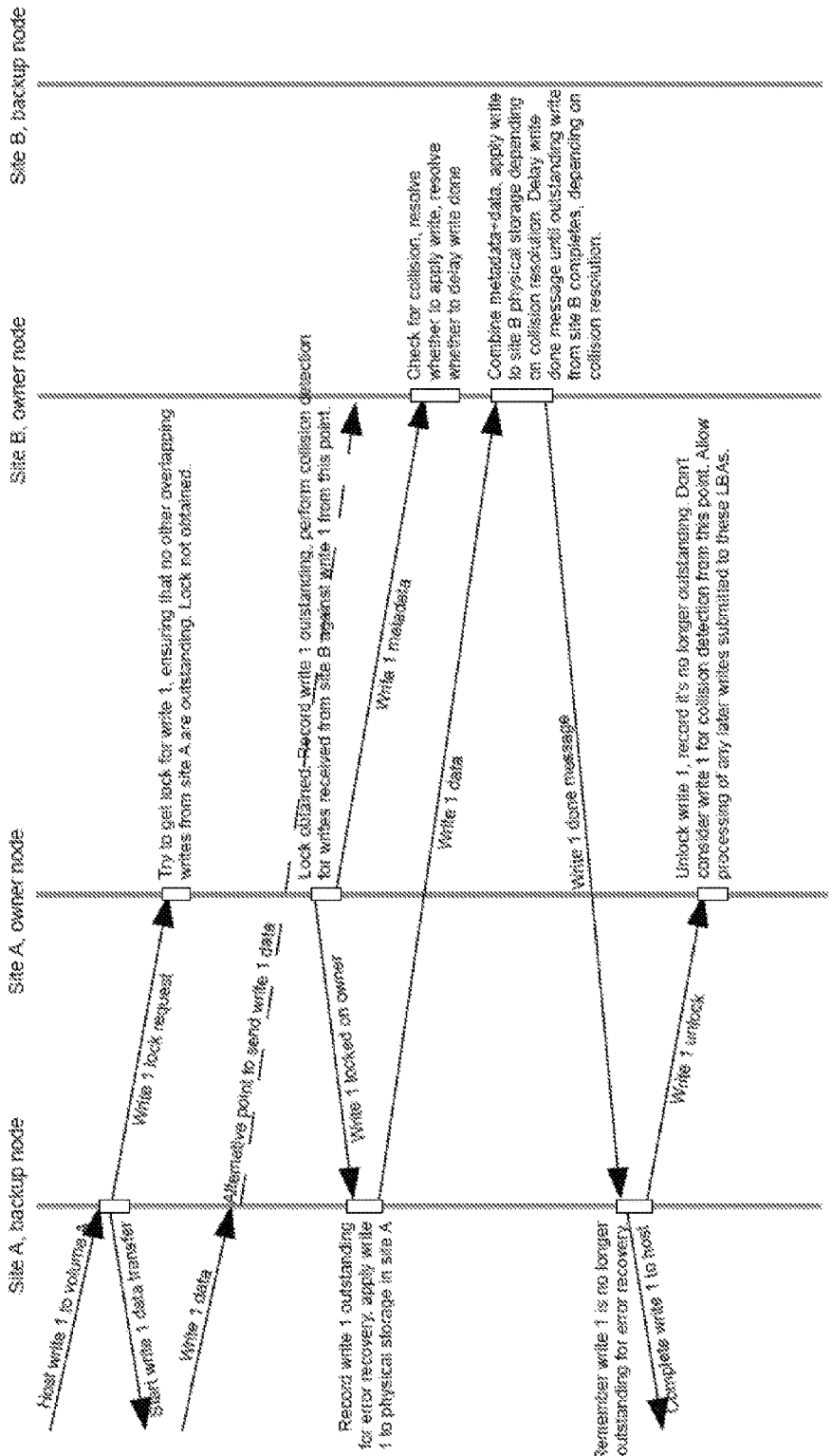
FIG. 6 is a schematic diagram illustrating the multi-node collision reconciliation system 100 of FIG. 1 in handling colliding write requests when the backup node is the processing node and obtaining a lock is delayed, in accordance with an embodiment of the invention.

FIG. 6 illustrates an example of the handling of colliding write requests similar to that of FIG. 5, except here a lock is not obtained immediately by the site A owner node. In the example embodiment, the site A backup node waits for the site A owner node to respond with Write 1 lock on owner prior to sending Write 1 data to the site B owner node. However, in an alternative embodiment illustrated by a dotted line in FIG. 6, the site A backup node sends Write 1 data (Alternative point to send write 1 data) to the site B owner node as soon as the Write 1 data has been transferred from the host. While this alternative embodiment may provide a small performance increase due to lesser latency, sending Write 1 data prior to obtaining a lock increases the time during which Write 1 data is outstanding, thereby prohibiting the site A backup node from sending other writes to the site B owner node, decreasing performance, and/or increasing message resource requirements.

It will be appreciated that embodiments of the invention could include more than two data storage devices, as long as each storage device contains at least one processing node, one partner node, one owner node, and one backup node. While in the embodiment described above the MAC address of the data storage devices is used for identification, it will be appreciated that any other "static" fact could be used. To give just one alternative example, the data storage devices could be assigned a priority number when they are added to the data storage system.

It will be appreciated that while the description herein refers to active-active replication of block-based storage, it may also be applicable to active-active replication of file-based or object-based storage.

The systems described herein may be understood to communicate over any current or future communications technology, including SAS, Fibre Channel or iSCSI, either in-memory within the same physical device, directly connected, over a Storage Area Network, over a general-purpose network, or over the Internet.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

Figure 7:
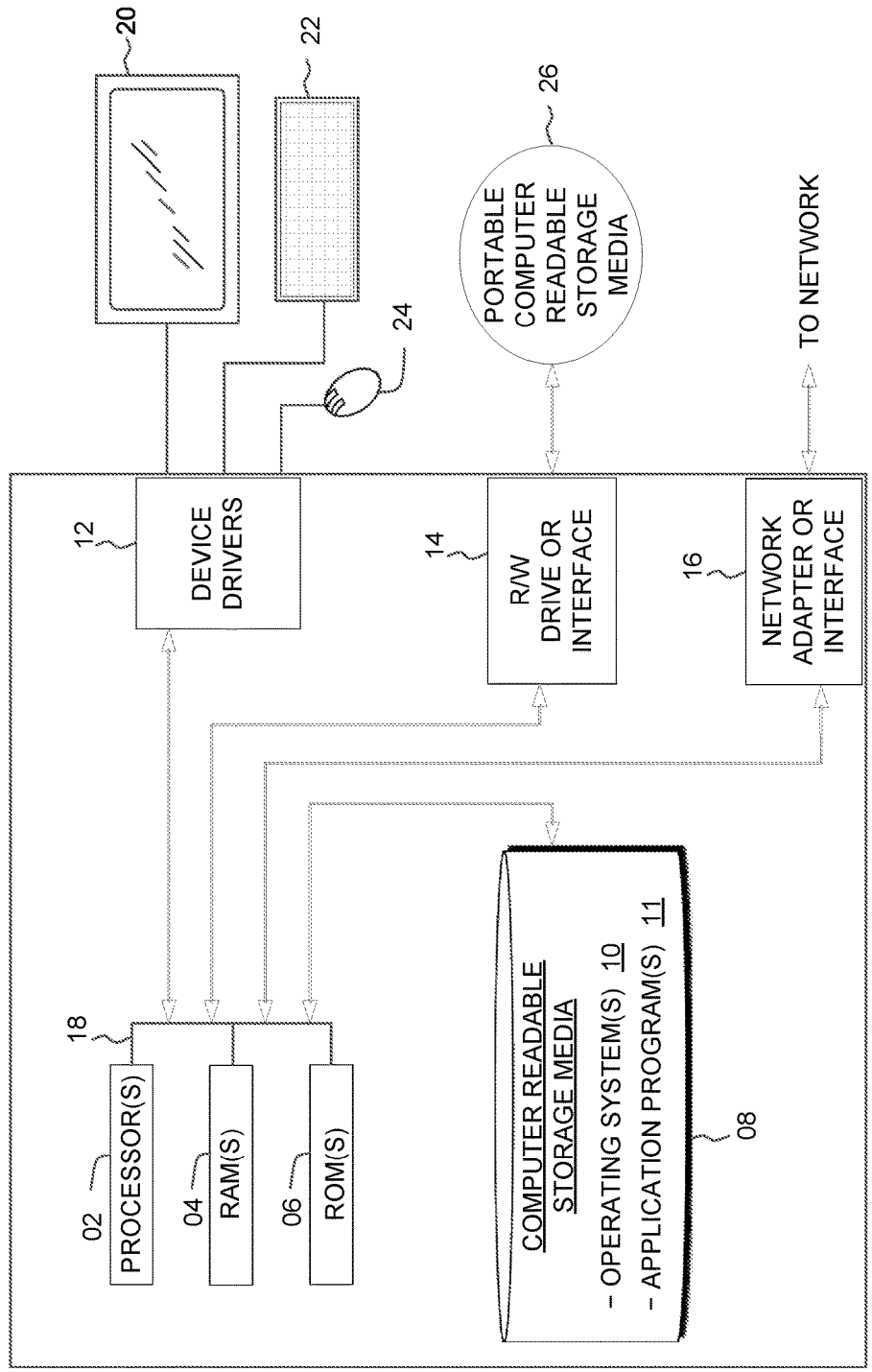
FIG. 7 is a block diagram depicting the hardware components of the multi-node collision reconciliation system 100 of FIG. 1, in accordance with an embodiment of the invention.

FIG. 7 depicts a block diagram of components of nodes and data storage systems of multi-node collision reconciliation system 100 of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing devices of sites A and B may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 1 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices of sites A and B may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Said computing devices may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing devices on sites A and B may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention.

Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
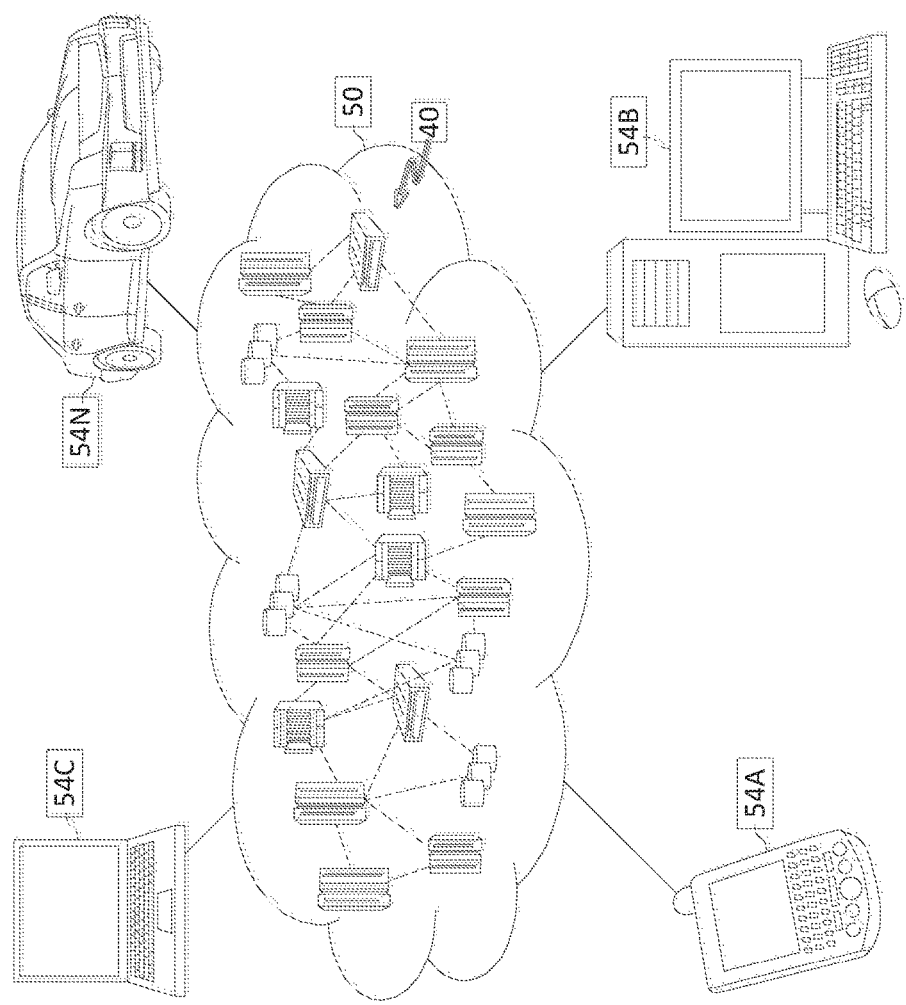
FIG. 8 depicts a cloud computing environment, in accordance with an embodiment of the present invention.

Referring now to FIG. 8, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 40 and cloud computing environment 50 can communicate with any type of computerized device over any type of network and/or network addressable connection (e.g., using a web browser).

Figure 9:
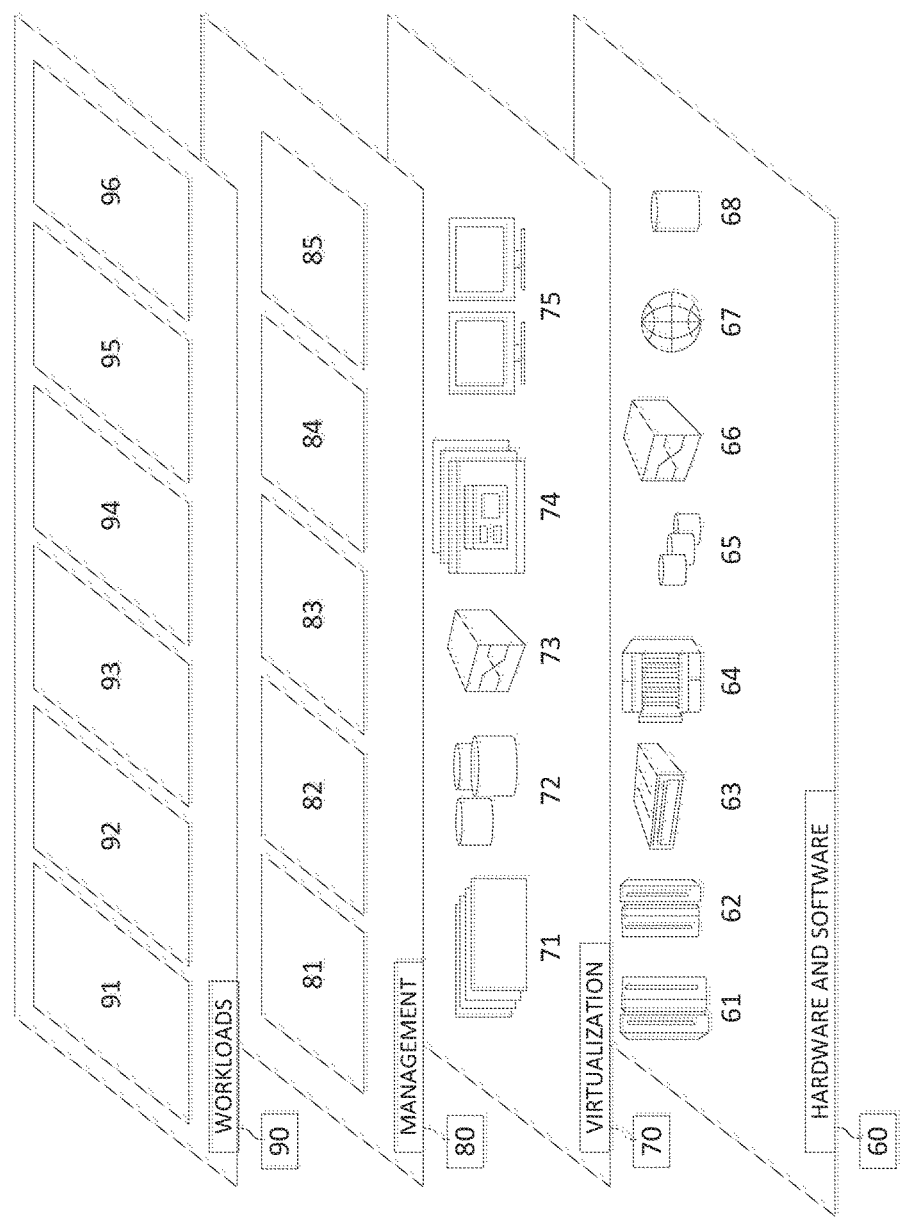
FIG. 9 depicts abstraction model layers, in accordance with an embodiment of the present invention.

Referring now to FIG. 9, a set of functional abstraction layers provided by cloud computing environment 50 (FIG. 4) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and write collision processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for resolving write conflicts within a multi-node data storage system, wherein the multi-node data storage system comprises:
   a first data storage device comprising a first set of data regions, wherein a first owner node and a first backup node process input and output to the first set of data regions; and
   a second data storage device comprising a second set of data regions corresponding to the first set of data regions of the first data storage device, and wherein a second owner node and a second backup node process input and output to the second set of data regions, and wherein the first data storage device is selected to override in write collisions with the second data storage device;
   and wherein the method comprises:
   either the first owner node or the first backup node receiving a first write request from a host device to update the first set of data regions;
   the first data storage device updating the first set of data regions in accordance with the first write request;
   the first data storage device sending the first write request to the second data storage device;
   prior to the first data storage device receiving a completion message from the second data storage device indicating that the second data storage device has been updated in accordance with the first write request, the first data storage device receiving a second write request from the second data storage device to update the first set of data regions; and
   the first data storage device sending a first completion message to the second data storage device indicating that the first set of data regions has been updated in accordance with the first write request, causing the second data storage device to update the second set of data regions in accordance with the first write request and to send a second completion message to the first data storage device indicating that the second data storage device has been updated in accordance with the first write request.

2. The method of claim 1, wherein the first owner node receives the first write request, and wherein updating the first set of data regions in accordance with the first write request further comprises:
   the first owner node locking the first set of data regions;
   the first owner node requesting a data transfer from the host device corresponding to the first write request;
   the first owner node sending metadata corresponding to the first write request to the first backup node;
   the first backup node recording the first write request as outstanding and sending a message to the first owner node indicating that the first write request is recorded as outstanding; and
   the first owner node applying the first write request to the first set of data regions.

3. The method of claim 2, wherein sending the first write request to the second data storage device further comprises:
   the first owner node sending metadata corresponding to the first write request and data corresponding to the first write request to the second owner node.

4. The method of claim 3, wherein the second data storage device sending the second completion message to the first storage device further comprises:
   the first owner node receiving a completion message from the second owner node;
   the first owner node unlocking the first set of data regions; and
   the first owner node sending a message to the first backup node to record the first write request as no longer outstanding.

5. The method of claim 1, wherein the first backup node receives the first write request, and wherein updating the first set of data regions in accordance with the first write request further comprises:
   the first backup node requesting a data transfer from the host device corresponding to the first write request;
   the first backup node sending a lock request message to the first owner node requesting a lock on the first set of data regions;
   based on receiving the lock request message, the first owner node locking the first set of data regions and sending a lock confirmed message to the first backup node; and
   the first backup node applying the first write request to the first set of data regions.

6. The method of claim 5, wherein sending the first write request to the second data storage device further comprises:
   the first owner node sending metadata corresponding to the first write request to the second owner node; and
   the first backup node sending data corresponding to the first write request to the second owner node.

7. The method of claim 5, wherein the second data storage device sending the second completion message to the first storage device further comprises:
   the second owner node sending a completion message to the first backup node; and
   the first owner node unlocking the first set of data regions and sending a message to the first backup node to record the first write request as no longer outstanding.

8. A computer program product for resolving write conflicts within a multi-node data storage system, wherein the multi-node data storage system comprises:

one or more non-transitory computer-readable storage media and program instructions stored on one or more of the non-transitory computer-readable storage media;

a first data storage device comprising a first set of data regions, wherein a first owner node and a first backup node process input and output to the first set of data regions; and a second data storage device comprising a second set of data regions corresponding to the first set of data regions of the first data storage device, and wherein a second owner node and a second backup node process input and output to the second set of data regions, and wherein the first data storage device is selected to override in write collisions with the second data storage device;

and wherein the computer program product comprises:

program instructions to receive, by either the first owner node or the first backup node, a first write request from a host device to update the first set of data regions;

program instructions to update, by the first data storage device, the first set of data regions in accordance with the first write request;

program instructions to send, by the first data storage device, the first write request to the second data storage device;

prior to the first data storage device receiving a completion message from the second data storage device indicating that the second data storage device has been updated in accordance with the first write request, program instructions to receive, by the first data storage device, a second write request from the second data storage device to update the first set of data regions; and program instructions to send, by the first data storage device, a first completion message to the second data storage device indicating that the first set of data regions has been updated in accordance with the first write request, the program instructions causing the second data storage device to update the second set of data regions in accordance with the first write request and to send a second completion message to the first data storage device indicating that the second data storage device has been updated in accordance with the first write request.

9. The computer program product of claim 8, wherein the first owner node receives the first write request, and wherein the program instructions to update the first set of data regions in accordance with the first write request further comprise:

program instructions to lock, by the first owner node, the first set of data regions;

program instructions to request, by the first owner node, a data transfer from the host device corresponding to the first write request;

program instructions to send, by the first owner node, metadata corresponding to the first write request to the first backup node;

program instructions to record, by the first backup node, the first write request as outstanding and program instructions to send a message to the first owner node indicating that the first write request is recorded as outstanding; and program instructions to apply, by the first owner node, the first write request to the first set of data regions.

10. The computer program product of claim 9, wherein the program instructions to send the first write request to the second data storage device further comprise:

program instructions to send, by the first owner node, metadata corresponding to the first write request and data corresponding to the first write request to the second owner node.

11. The computer program product of claim 10, wherein the program instructions to send, by the second data storage device, the second completion message to the first data storage device further comprise:

program instructions to receive, by the first owner node, a completion message from the second owner node;

program instructions to unlock, by the first owner node, the first set of data regions; and program instructions to send, by the first owner node, a message to the first backup node to record the first write request as no longer outstanding.

12. The computer program product of claim 8, wherein the first backup node receives the first write request, and wherein the program instructions to update the first set of data regions in accordance with the first write request further comprise:

program instructions to request, by the first backup node, a data transfer from the host device corresponding to the first write request;

program instructions to send, by the first backup node, a lock request message to the first owner node requesting a lock on the first set of data regions;

based on receiving the lock request message, program instructions to lock, by the first owner node, the first set of data regions and program instructions to send a lock confirmed message to the first backup node; and program instructions to apply, by the first backup node, the first write request to the first set of data regions.

13. The computer program product of claim 12, wherein the program instructions to send the first write request to the second data storage device further comprise:

program instructions to send, by the first owner node, metadata corresponding to the first write request to the second owner node; and program instructions to send, by the first backup node, data corresponding to the first write request to the second owner node.

14. The computer program product of claim 13, wherein the program instructions to send, by the second data storage device, a second completion message to the first storage device further comprise:

program instructions to send, by the second owner node, a completion message to the first backup node; and program instructions to unlock, by the first owner node, the first set of data regions and program instructions to send a message to the first backup node to record the first write request as no longer outstanding.

15. A computer system for resolving write conflicts within a multi-node data storage system, wherein the multi-node data storage system comprises:

one or more computer processors, one or more computer-readable storage media, and program instructions stored on one or more of the computer-readable storage media for execution by at least one of the one or more processors;

a first data storage device comprising a first set of data regions, wherein a first owner node and a first backup node process input and output to the first set of data regions; and a second data storage device comprising a second set of data regions corresponding to the first set of data regions of the first data storage device, and wherein a second owner node and a second backup node process input and output to the second set of data regions, and wherein the first data storage device is selected to override in write collisions with the second data storage device; and the program instructions comprising:

program instructions to receive, by either the first owner node or the first backup node, a first write request from a host device to update the first set of data regions;

program instructions to update, by the first data storage device, the first set of data regions in accordance with the first write request;

program instructions to send, by the first data storage device, the first write request to the second data storage device;

prior to the first data storage device receiving a completion message from the second data storage device indicating that the second data storage device has been updated in accordance with the first write request, program instructions to receive, by the first data storage device, a second write request from the second data storage device to update the first set of data regions; and program instructions to send, by the first data storage device, a first completion message to the second data storage device indicating that the first set of data regions has been updated in accordance with the first write request, the program instructions causing the second data storage device to update the second set of data regions in accordance with the first write request and to send a second completion message to the first data storage device indicating that the second data storage device has been updated in accordance with the first write request.

16. The computer system of claim 15, wherein the first owner node receives the first write request, and wherein the program instructions to update the first set of data regions in accordance with the first write request further comprise:

program instructions to lock, by the first owner node, the first set of data regions;

program instructions to request, by the first owner node, a data transfer from the host device corresponding to the first write request;

program instructions to send, by the first owner node, metadata corresponding to the first write request to the first backup node;

program instructions to record, by the first backup node, the first write request as outstanding and program instructions to send a message to the first owner node indicating that the first write request is recorded as outstanding; and program instructions to apply, by the first owner node, the first write request to the first set of data regions.

17. The computer system of claim 16, wherein the program instructions to send, by the second data storage device, the second completion message to the first data storage device further comprise:

program instructions to receive, by the first owner node, a completion message from the second owner node;

program instructions to unlock, by the first owner node, the first set of data regions; and program instructions to send, by the first owner node, a message to the first backup node to record the first write request as no longer outstanding.

18. The computer system of claim 15, wherein the first backup node receives the first write request, and wherein the program instructions to update the first set of data regions in accordance with the first write request further comprise:

program instructions to request, by the first backup node, a data transfer from the host device corresponding to the first write request;

program instructions to send, by the first backup node, a lock request message to the first owner node requesting a lock on the first set of data regions;

based on receiving the lock request message, program instructions to lock, by the first owner node, the first set of data regions and program instructions to send a lock confirmed message to the first backup node; and program instructions to apply, by the first backup node, the first write request to the first set of data regions.

19. The computer system of claim 18, wherein the program instructions to send the first write request to the second data storage device further comprise:

program instructions to send, by the first owner node, metadata corresponding to the first write request to the second owner node; and program instructions to send, by the first backup node, data corresponding to the first write request to the second owner node.

20. The computer system of claim 19, wherein the program instructions to send, by the second data storage device, a second completion message to the first storage device further comprise:

program instructions to send, by the second owner node, a completion message to the first backup node; and program instructions to unlock, by the first owner node, the first set of data regions and program instructions to send a message to the first backup node to record the first write request as no longer outstanding.

* * * * *